United States Patent

Duben

[15] 3,703,711

[45] Nov. 21, 1972

[54] MEMORY CELL WITH VOLTAGE LIMITING AT TRANSISTOR CONTROL TERMINALS

[72] Inventor: Franklin T. Duben, Dedham, Mass.

[73] Assignee: Honeywell Information Systems Inc., Waltham, Mass.

[22] Filed: Jan. 4, 1971

[21] Appl. No.: 103,483

[52] U.S. Cl. ..............................340/173 FF, 307/292
[51] Int. Cl. .......G11c 7/00, G11c 11/40, H03k 3/286
[58] Field of Search..........340/173 FF; 307/291, 292

[56] References Cited

UNITED STATES PATENTS 3,582,973 6/1971 Dorward ................307/292 X
3,389,383 6/1968 Burke ...................340/173 FF
2,909,675 10/1959 Edson ....................307/292 X
3,067,339 12/1962 Poppelbaum ........340/173 FF
3,300,689 1/1967 Beddoes ................307/291 X

*Primary Examiner*—James W. Moffitt
*Assistant Examiner*—Stuart Hecker
*Attorney*—Ronald T. Reiling and Fred Jacob

[57] ABSTRACT

A memory cell comprising cross coupled switch elements with internal limiting means for establishing a switching condition requires only two signal lines to both select a cell from an array and perform reading and writing operations.

7 Claims, 4 Drawing Figures

INVENTOR

Franklin T. Duben

By [signature]

Attorney

| | A | B | C | D | WORD LINE VOLTAGE | OFF TRANSISTOR |
|---|---|---|---|---|---|---|
| CASE 1 | -0.6V | 0.0V | -0.6V | 0.0V | 0.0 VOLTS | 23 |
| CASE 2 | -0.6V | -0.6V | 0.0V | 0.0V | 0.0 VOLTS | 21 |
| CASE 3 | 0.4V | 1.0V | 0.4V | 0.4V | 1.5 VOLTS | 23 |
| CASE 4 | 0.4V | 0.4V | 1.0V | 0.0V | 1.5 VOLTS | 21 |
| CASE 5 | 1.2V | 1.8V | 1.2V | 1.2V | 3.0 VOLTS | 23 |
| CASE 6 | 0.6V | 1.2V | 0.6V | 0.0V | 3.0 VOLTS | 21 |

INVENTOR
Franklin T. Duben
By
Attorney

MEMORY CELL WITH VOLTAGE LIMITING AT TRANSISTOR CONTROL TERMINALS

BACKGROUND OF THE INVENTION

This invention relates to memory cells. More specifically, the invention relates to semiconductor memory cells adapted for electronic data processing.

Semiconductor memory cells, especially integrated circuit semiconductor memory cells, are included in computer systems in order to provide fast access to stored information. There are several problem areas associated with memory cells when used in large computer memory systems. One problem area is heat dissipation. Heat limits the permissible number of individual memory cells in a single integrated circuit package. Additionally, for a memory array comprising thousands or tens of thousands of memory cells, the power dissipation is considerable and extreme care must be taken in mechanical layout and cooling considerations. Moreover, a high heat dissipation is indicative of large power consumption which requires large power supplies and therefore adds to the overhead cost of the memory unit.

An important consideration in memory unit configurations is the cost per bit stored. Integrated circuit construction with a high manufacturing yield helps lower the cost per cell (bit). A lack of critical components necessitating tight tolerances improves the manufacturing yield.

Another problem area encountered in integrated circuit production, especially in memory arrays, is the interconnection considerations. In order to use an integrated circuit chip encased in a metal or plastic package, connection terminals must be provided for connecting the chip to external leads which are in turn connected to other packages and external power and control circuitry. These connections to the circuit chip often take up a considerable area with respect to the chip size and may be the primary limiting factor in the size and complexity of an integrated circuit device. Thus, for a memory cell design intended for fabrication with several memory cells per integrated circuit package, it is extremely important to keep the number of interconnecting lines needed for power, selection, reading, and writing to an absolute minimum.

In summary, heat and power considerations, integrated circuit production yields, and interconnection problems have heretofore limited the use of large semiconductor memory arrays.

It is an object of the present invention to overcome the foregoing problems and disadvantages.

It is another object of the invention to provide an improved memory cell.

It is another object of the invention to provide a memory cell for use in a large memory array.

It is another object of the invention to provide a semiconductor memory cell suitable for integrated circuit construction.

It is another object of the invention to provide a semiconductor memory cell capable of high speed operation.

It is another object of the invention to minimize external connections required by a memory cell array.

SUMMARY OF THE INVENTION

A semiconductor memory cell comprising cross coupled switch elements such as transistors has internal limiting means such as diodes for establishing a switching condition. The limiting means restricts the voltage across a control terminal of one switch element to a predetermined maximum value. A selectively activated second limiting means restricts the voltage across a control terminal of a second switch element to a value less than that allowed by the first limiting means.

According to another feature of the invention, an output transistor performs the selective role of buffering and isolating the cell output signal or establishing a predetermined clamping voltage level.

It is an advantage of the invention that the standby power dissipation is maintained at a minimum value.

It is another advantage of the invention that only a single power supply connection is required.

It is another advantage of the invention that only two lines are necessary to both select a cell from an array and perform reading and writing operations.

These and other features of the invention are pointed out in the claims. The foregoing summary will become clear and additional modifications will suggest themselves from the following detailed description when read in light of the accompanying drawings.

DETAILED DESCRIPTION OF THE PREFERRED EMBODIMENT

Figure 1:
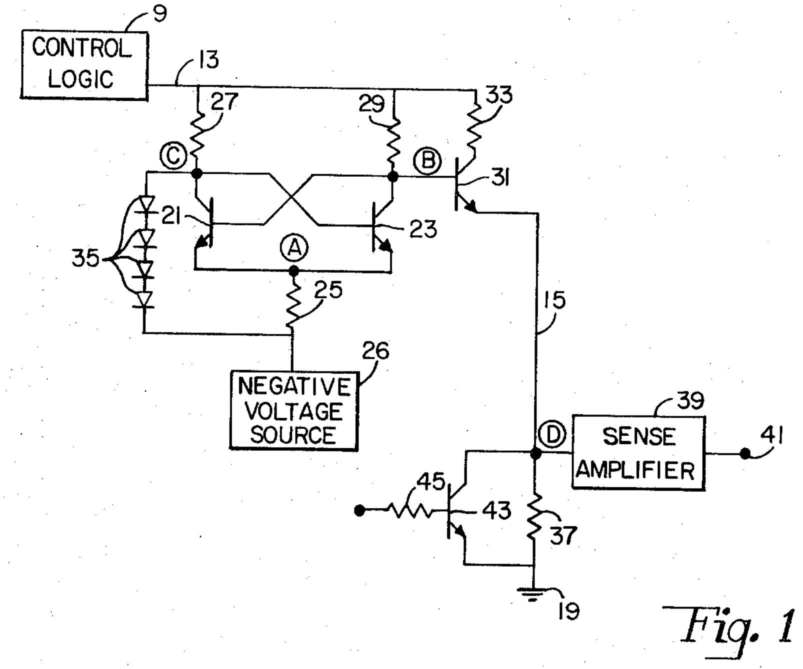
FIG. 1 is a schematic diagram of a preferred embodiment of the invention comprising a transistor memory cell.

An electrical schematic diagram of a preferred embodiment of the invention is shown in FIG. 1. Using the nomenclature of the memory cell art, a read and write control line 13 is referred to as a word line while a stored binary data indicating line 15 is referred to as a digit sense line. A control logic unit 9 supplies appropriate voltage levels to word line 13 as hereinafter described to effectuate desired operations.

In summary of the cell operation, the memory cell is maintained in a minimum power quiescent state by applying zero volts to the word line 13. To read the contents of the memory cell, the word line voltage is raised to 1.5 volts and the voltage on the digit sense line 15 is examined to determine whether a ONE or ZERO value of data is stored. To write a ONE value of data into the memory cell, the word line voltage is raised from zero or 1.5 volts to 3 volts and then returned to zero or 1.5 volts. To write a ZERO value into the memory cell, the word line is raised to 3 volts, transistor 43 is turned on to clamp word line 15 to a ground reference level and then the word line voltage is lowered. Therefore, it is only necessary to have two selectively controllable connections to the cell to perform all reading and writing operations, i.e., the word line 13 and the digit sense line 15.

The preferred embodiment of FIG. 1 is seen to comprise cross coupled N-P-N transistors 21 and 23 having an emitter connection to a resistor 25 which resistively couples the emitters to a source of negative voltage 26. As shown in FIG. 1, the collector terminals of transistors 21 and 23 are resistively coupled to word line 13 through respective collector resistors 27 and 29. The particular stored information contained in the cell is indicated by the collector voltage of transistor 23. The collector of transistor 23 is connected to the base of an output transistor 31 which has its emitter connected to the digit sense line 15. The collector terminal of transistor 31 is coupled to the word line 13 through a resistor 33.

Four diodes 35 are connected in series between the collector of transistor 21 and the negative voltage source 26. The diodes 35 limit the collector voltage of transistor 21 and hence the base voltage of transistor 23 to a maximum value of four diode drops above the level of the negative voltage source 26. For a diode drop of about 0.6 volt per diode, the maximum attainable base voltage level of transistor 23 would be approximately 2.4 volts above the level of the negative voltage source 26.

The output transistor 31 when in an active state provides a signal through its emitter to the digit sense line 15 which is connected to a current sensing resistor 37 which is returned to a ground reference 19. A sense amplifier 39 is connected to the junction of the digit sense line 15 and the current sensing resistor 37 to provide an amplified and buffered version of the voltage across the resistor 37 over an output lead 41 to data processing equipment as is well known in the art.

A transistor 43 with collector and emitter terminals connected across the resistor 37 is normally off except when selectively activated to assume a short circuit condition by application of a positive voltage level to base resistor 45. The turning on of transistor 43 effectively shorts the digit sense line 15 to the ground reference 19.

In a specific example, collector resistors 27 and 29 and emitter resistor 25 each have a value of 500 ohms. The negative voltage source 26 provides a constant voltage of −1.2 volts.

In order to simplify the following discussion, it will be helpful to assume that a saturated transistor has equal emitter and collector voltages (i.e., $V_{CE}$ (*Sat*) = 0). It will also be assumed that the base to emitter drop of a conducting transistor is 0.6 volts. The voltage drop of a forward conducting diode will also be considered to be 0.6 volts. The cell will be said to be storing a ONE value of data when transistor 23 is off and will be said to be storing a ZERO value of data when transistor 23 is on.

Figures 2, 4:
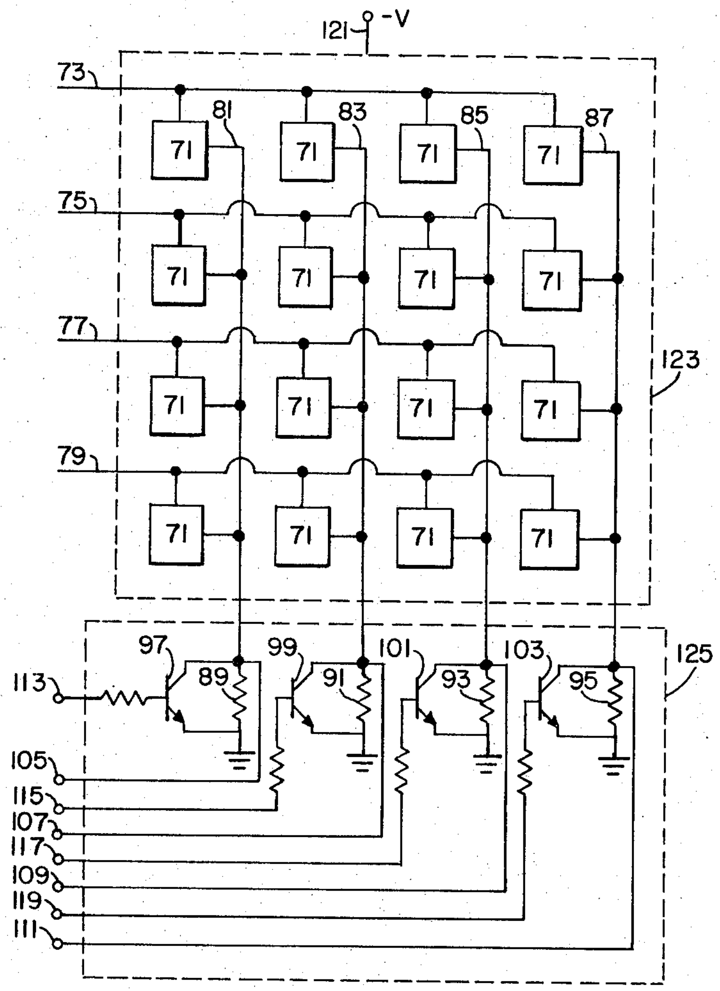
FIG. 2 is a table showing typical voltages at various locations in the embodiment of FIG. 1 under different operating conditions.
FIG. 4 is a block diagram of a memory system composed of an array of memory cells such as shown in FIG. 1.

The operation of the cell will now be described with reference to the Table of FIG. 2 showing representative voltages at various points within the circuit of FIG. 1 under various levels of word line voltage.

Cases 1 and 2 show the voltages at the indicated positions (A, B, C, and D) of the cell of FIG. 1 in the quiescent state (i.e., the word line voltage is zero volts). Case 1 shows the voltages existing when a ONE value of data is stored. Case 2 shows the voltages existing when a ZERO value of data is stored. The negative voltage source 26 provides the necessary power to maintain the transistors 21 and 23 in their respective conductive and non-conductive states. As shown in the Table, the voltage on the common emitters of transistors 21 and 23 remains at −0.6 volts independent of which transistor is conducting. When transistor 23 is off, the voltage at point B is essentially equal to the word line voltage of zero volts (ignoring the small base current required for on transistor 21), which is well below the 0.6 volts required to turn on the output transistor 31. Therefore, whatever the state of the memory cell with regard to binary information stored, the output transistor 31 isolates this information (voltage) from word line 15.

In order to read the information stored within a memory cell, the word line voltage is raised to 1.5 volts. This voltage will establish a voltage of about 0.4 volts on the collector of the on transistor and about one volt on the collector of the off transistor. These conditions are shown in Cases 3 and 4 in the Table of FIG. 2. Therefore, if the memory cell is storing a ONE value (transistor 23 is off) then transistor 31 has a 1 volt level on its base and will supply current from word line 13 to sense line 15 so as to generate about 0.4 volts across the sense line resistor 37. This word line voltage signal is then appropriately shaped and amplified by the sense amplifier 39 to provide an appropriate signal over lead 41 for further processing as is well known in the art. Should the cell have been storing a ZERO value (transistor 23 is on) then no voltage will appear on word line 15 since the 0.4 volts on the base of transistor 31 is not enough to cause conduction.

In order to write a ONE value into the cell, the word line voltage is raised to 3 volts and transistor 43 is maintained in its normal off state. The resultant voltages are shown in Case 5 of FIG. 2. The diodes 35 limit the voltage on the base of transistor 23 to about 4 diode drops (2.4 volts) above the negative voltage source 26 value of −1.2 volts. Thus the base of transistor 23 is restricted to a possible maximum voltage level of 1.2 volts. The voltage limiting action of diodes 35 causes transistor 23 to be turned off regardless of the previous state of the cell. If transistor 23 were already off (a ONE value of data had previously been stored), then transistor 21 remains conducting throughout the writing operation. If there were no limiting diodes 35, the application of 3 volts to word line 13 would cause the common emitter voltage A to rise toward 1.4 volts. However, with the diodes 35, the common emitters only reach 1.2 volts, the transistor 23 is positively turned off, and the transistor 21 is conducting. When the word line voltage is lowered back to its quiescent zero level, the memory cell transistors 21 and 23 retain their respective conduction states. Thus, the application of a 3 volt word line voltage to the cell, with transistor 43 remaining off, writes a ONE value of binary data into the cell.

In order to write a ZERO value of binary data into the memory cell, the word line is raised to a 3 volt level and the transistor 43 is turned on by external circuitry. This activation of transistor 43 effectively clamps the digit sense line 15 to a zero value reference level (ground 19). If a ZERO value of data had already been stored, then transistor 23 remains conducting throughout the writing operation. The approximate voltage potentials established at various points in the circuit are shown by Case 6 of FIG. 2. Output transistor 31 by virtue of its inherent base emitter diode now performs the role of limiting the collector voltage of transistor 23 and hence the base voltage of transistor 21 to a level of about 0.6 volts. This lower clamping voltage level causes transistor 21 to be turned off and transistor 23 to be turned on by the 3 volts on word line 13 in a manner analogous to the aforedescribed case of writing a ONE value into the cell. Therefore output transistor 31 performs a dual role, both providing a conventional memory cell buffering action in blocking the memory cell voltages from the digit sense line 15 except when desired and, when the digit sense line 15 is clamped to a ground reference level, providing a voltage limiting action establishing a level lower than that set by diodes 35.

Figure 3:
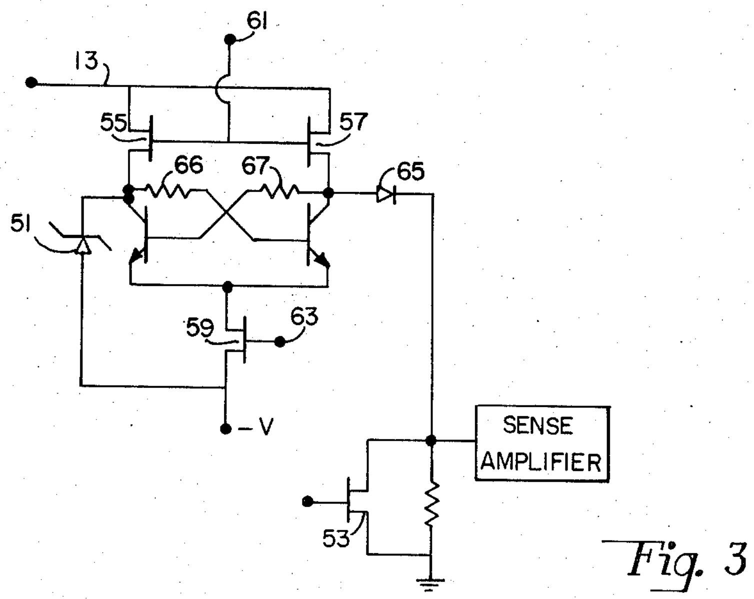
FIG. 3 is a schematic diagram showing alternative embodiments for some of the elements of the memory cell of FIG. 1.

FIG. 3 is a schematic diagram showing alternative embodiments for some of the elements of the memory cell of FIG. 1. The series connected diodes 35 of FIG. 1 are replaced by a Zener diode 51. The transistor 43 is replaced by a field-effect transistor (FET) 53. The resistors 27, 29, and 25 of FIG. 21 are replaced by FETs 55, 57, and 59. However, additional memory cell circuitry will be needed on the control leads 61 and 63 of these FETs to provide appropriate resistive action under changing voltage conditions within the cell. The output transistor 31 of FIG. 1 is replaced with a conventional diode 65 in FIG. 3. A pair of base resistors 66 and 67 have been included in the circuit of FIG. 3. The memory cell of FIG. 3 operates identically to that of FIG. 1 with merely a substitution of component types which would be obvious to one skilled in the art.

FIG. 4 is a block diagram of a memory system composed of an array of memory cells such as that shown in FIG. 1. The memory cell of FIG. 1 is indicated as blocks 71 arranged in a four word, four bit array. The word lines are identified as 73, 75, 77, and 79. The digit sense lines are identified as 81, 83, 85, and 87. The current sensing resistors are identified as 89, 91, 93, and 95 respectively for each of the aforementioned digit sense lines. The ZERO writing transistors are identified as 97, 99, 101, and 103.

In operation, one of the word lines 73–79 is raised to the appropriate voltage value (1.5 volts or 3 volts) from its quiescent zero level in order to effectuate a desired read or write operation. For example, in order to read the bottom row of memory cells connected to word line 79, the word line voltage is raised from zero to 1.5 volts. The binary data stored in each respective cell is fed over lines 105, 107, 109, and 111 to a respective sense amplifier. Thus, for the array shown, four bits are read out in parallel.

In order to write data into the last row of memory cells, transistors 97–103 are selectively maintained off or turned on and the word line 79 is raised to a 3 volt level. For example, to write a 1-0-1-0 pattern, transistor control lines 113 and 117 are maintained at their normal zero voltage level to keep their respective transistors 97 and 101 turned off thus causing ONE value binary data to be written into the associated cells. Concurrently, transistor control lines 115 and 119 are raised to a positive level by external circuitry to turn on their respective transistors 99 and 103 thus causing ZERO value binary data to be written into the associated cells in the last row of the array. The word line voltage is then lowered back to zero volts. For the four word, four bit array of memory cells enclosed in block 123, nine external lines are required, i.e., four word lines, four digit sense lines and a supply voltage terminal 121. Since there are only nine external connections, the integrated circuit manufacturing of 16 memory cells on a single chip is very practical especially since the described circuits 71 have no critical components.

The current sensing resistors and zero writing transistors enclosed in block 125 may also be manufactured as an integrated circuit component. For a memory array such as 123, there are eight external connections required by the reading and ZERO writing control array 125, i.e., four write control lines 113–119 and four digit sense input lines 81–87, which have the same external connections as the four sense amplifier input lines 105–111.

The disclosed invention provides a memory cell suitable for integrated circuit construction, having minimum stand-by power consumption, requiring only two control lines, having only a single power supply connection, and having no critical components. These cells, when arranged in an array, are especially useful for high speed computer applications. The memory array of FIG. 4 may be easily extended in both word and bit directions.

From the foregoing discussion it will be apparent that numerous modifications, departures, substitutions, and equivalences may now occur to those skilled in the art, all of which fall into the scope and spirit of the present invention.

What is claimed is:

1. A memory cell having first and second junction transistors with base-collector cross-coupling and with common emitters coupled through an emitter resistor to a fixed voltage source, a pair of collector resistors respectively coupling the transistor collectors to a word line, and an output transistor having its base coupled to the first transistor collector and its emitter coupled to a sense line, the improvement comprising:

voltage responsive voltage limiting means coupled to said first transistor base terminal for restricting the voltage level established thereat to a predetermined maximum value so as to selectively effect positive control of the state of conduction of said first transistor; and level setting means coupled to said sense line for selectively establishing a predetermined voltage level thereon, said level setting means being adapted to cause conduction of said first transistor and non-conduction of said second transistor.

2. An information storage element comprising:

first and second switch elements each having a control terminal and two primary current conduction terminals;

means intercoupling said first and second switch elements for controlling conduction of said elements in order to provide complementary conducting states at said primary conduction terminals;

first voltage responsive voltage limiting means coupled to said control terminal of said first switch element to restrict the maximum voltage level established thereat to a predetermined value so as to selectively control conduction thereof responsive to operation of said first voltage limiting means; and control means to selectively establish a first voltage level and a second voltage level respectively in excess of said predetermined value and less than said predetermined value;

said control means being coupled to the control terminals of said first and second switch elements so as to selectively control conduction of said switch elements in order to effect operation thereof in a first predetermined complementary conducting state responsive to the establishment of said first voltage level.

3. The storage element of claim 2 additionally comprising;

second voltage limiting means coupled to said control terminal of said second switch element and adapted to be selectively activated responsive to the establishment of said first voltage to restrict the maximum voltage applied to said second control terminal to a value less than said predetermined value so as to effect operation of said switch elements in a second predetermined complementary conducting state.

4. The storage element of claim 3 wherein said control means includes a third switch element coupled to said control element of said second switch element, said third switch element being adapted to selectively establish the second voltage level.

5. The storage element of claim 2 wherein said first voltage responsive voltage limiting means comprises at least one unidirectional semiconductor device.

6. The storage element of claim 5 wherein said at least one unidirectional semiconductor device comprises a plurality of serially connected diodes for maintaining said first switch element in a predetermined state responsive to operation of said diodes.

7. The storage element of claim 5 wherein said at least one unidirectional semiconductor device comprises a Zener diode.

* * * * *